US012383928B2

(12) United States Patent
Tibah et al.

(10) Patent No.: US 12,383,928 B2
(45) Date of Patent: Aug. 12, 2025

(54) ROOFING MATERIALS AND METHODS OF MAKING ROOFING MATERIALS WITHOUT EXTERNAL HEAT

(71) Applicant: BMIC LLC, Dallas, TX (US)

(72) Inventors: Denis Muki Tibah, Waxahachie, TX (US); Ramil Marcelo L. Mercado, Waxahachie, TX (US); Jarod L. Krajca, Ennis, TX (US); Carl Stipe, Grapevine, TX (US); Steven E. Sparks, Midlothian, TX (US)

(73) Assignee: BMIC LLC, Dallas, TX (US)

( * ) Notice: Subject to any disclaimer, the term of this patent is extended or adjusted under 35 U.S.C. 154(b) by 0 days.

(21) Appl. No.: 18/243,184

(22) Filed: Sep. 7, 2023

(65) Prior Publication Data

US 2024/0082874 A1 Mar. 14, 2024

Related U.S. Application Data

(60) Provisional application No. 63/405,683, filed on Sep. 12, 2022.

(51) Int. Cl.

| | |
|---|---|
| ***B05D 3/00*** | (2006.01) |
| ***B05D 7/04*** | (2006.01) |
| ***E04D 5/10*** | (2006.01) |
| ***E04D 5/12*** | (2006.01) |

(52) U.S. Cl.

CPC ............... *B05D 7/04* (2013.01); *B05D 3/007* (2013.01); *E04D 5/10* (2013.01); *E04D 5/12* (2013.01); *B05D 2518/00* (2013.01)

(58) Field of Classification Search

CPC .. B05D 3/007; B05D 7/04; E04D 5/10; E04D 5/12

See application file for complete search history.

(56) References Cited

U.S. PATENT DOCUMENTS 3,765,972 A * 10/1973 Wesp ..................... C09J 133/12 428/317.5

4,141,187 A * 2/1979 Graves ..................... E04D 7/00 52/309.3

4,293,597 A * 10/1981 Bessmer ..................... E04D 7/00 427/372.2

4,705,840 A * 11/1987 Buckanin ..................... A61L 15/12 528/53

5,261,165 A * 11/1993 Tate ..................... F26B 3/30 34/68

(Continued)

OTHER PUBLICATIONS

Goodrum, the PMMA Revolution, IIBEC Interface, Nov. 2016, p. 12-15.

*Primary Examiner* — Nathan H Empie

(74) *Attorney, Agent, or Firm* — Venable LLP

(57) ABSTRACT

This invention, in embodiments, relates to a method of preparing a roofing material that includes obtaining a substrate and obtaining a non-foam, coating composition comprising a polymeric resin and a carrier. The coating composition is (i) substantially free of water and (ii) in the form of a liquid at at least 23° F. The method further includes applying the coating composition to a surface of the substrate to prepare a coated substrate, and exposing the coated substrate to a reaction generator to polymerize the coating composition and thereby solidify the coating composition on the coated substrate to form the roofing material.

13 Claims, 4 Drawing Sheets

(56) References Cited

U.S. PATENT DOCUMENTS

| | | | |
|---|---|---|---|
| 5,380,552 | A | 1/1995 | George et al. |
| 6,913,816 | B2 | 7/2005 | Longcor, IV |
| 2002/0160151 | A1 | 10/2002 | Pinault et al. |
| 2007/0087166 | A1 * | 4/2007 | Lee .......................... E04D 7/005 428/143 |
| 2008/0060301 | A1 * | 3/2008 | Wang ...................... C08L 53/00 52/408 |
| 2008/0124576 | A1 * | 5/2008 | Elliott ...................... C08J 5/244 522/83 |
| 2021/0071422 | A1 | 3/2021 | Lai |
| 2021/0095473 | A1 | 4/2021 | Zheng |
| 2021/0253892 | A1 | 8/2021 | Cheung |
| 2021/0268718 | A1 | 9/2021 | Cox |
| 2021/0308997 | A1 | 10/2021 | Ackermann |
| 2021/0332593 | A1 | 10/2021 | Kalkanoglu |
| 2024/0084599 | A1 | 3/2024 | Tibah |

* cited by examiner

ROOFING MATERIALS AND METHODS OF MAKING ROOFING MATERIALS WITHOUT EXTERNAL HEAT

This application claims the priority of U.S. provisional application Ser. No. U.S. 63/405,683 entitled "Roofing Materials and Methods of Making Roofing Materials Without External Heat" filed Sep. 12, 2022, which is incorporated herein by reference in its entirety for all purposes.

FIELD OF THE INVENTION

This invention relates to roofing materials and methods of making roofing materials without external heat or a necessity for heat. The methods include applying a coating composition having a polymeric resin and a carrier to a substrate and polymerizing the coating composition using a reaction generator.

BACKGROUND OF THE INVENTION

Typically, roofing materials, such as, e.g., shingles, are produced by applying a coating or a molten material (e.g., an asphalt-based composition) to a substrate, such as, e.g., a fiberglass or felt mat.

SUMMARY OF THE INVENTION

One embodiment of this invention pertains to a method of preparing a roofing material that includes (a) obtaining a substrate, (b) obtaining a non-foam, coating composition comprising a polymeric resin and a carrier, wherein the coating composition is (i) substantially free of water and (ii) in the form of a liquid at at least 23° F., (c) applying the coating composition to a surface of the substrate to prepare a coated substrate, and (d) exposing the coated substrate to a reaction generator to polymerize the coating composition and thereby solidify the coating composition on the coated substrate to form the roofing material.

In one embodiment, the method further comprises preparing the coating composition. According to another embodiment, the preparing the coating composition is conducted without applying heat.

In one embodiment, heat is generated in situ and released during the reaction to prepare the coating.

According to an embodiment, the coating composition is in the form of a liquid at at least 59° F.

In one embodiment, the reaction generator comprises at least one of (i) a catalyst or activator, (ii) one or more of a curing agent or a crosslinking agent or a curing membrane, (iii) moisture, (iv) air, (v) radiation, or (vi) any combination of (i), (ii), (iii), (iv), or (v).

In one embodiment, the carrier comprises a natural oil, a natural resin, a natural wax, a synthetic oil, a synthetic resin, a synthetic wax, or a combination thereof.

In one embodiment, the method further comprises applying roofing granules to the coated substrate. According to another embodiment, the step of applying roofing granules to the coated substrate occurs prior to the step of exposing the coated substrate to a reaction generator (e.g., a curing or crosslinking agent or medium) to polymerize the coating composition. According to another embodiment, the step of applying roofing granules to the coated substrate is conducted with or without pressing.

In one embodiment, the polymeric resin comprises at least one of an acrylic, a methacrylate, urethane, isocyanate, epoxy, ester, alcohol, polyamides, polyimide, carboxylic acid, acid anhydride, aldehydes, vinyl chemistries, polyolefins, or combinations thereof. According to another embodiment, the polymeric resin comprises polymethyl methacrylate (PMMA).

In one embodiment, the coating composition further comprises one or more of a solvent, an oil, a wax, a filler, or a combination thereof.

In one embodiment, the coating composition further comprises a filler in an amount of 30 percent to 60 percent by weight of the total weight of the coating composition.

In one embodiment, the substrate comprises one of a fiberglass mat, a polyester mat, a scrim, a membrane, or a combination thereof.

In one embodiment, the coating composition has a viscosity of at least 200 cP when in the form of a liquid.

In one embodiment, the step of applying the coating composition to a surface of the substrate is conducted via at least one of dip coating, die coating, spray coating, roll coating, extrusion and form molding, or a combination thereof.

In an embodiment, the roofing material comprises one of a roofing shingle and a roofing membrane. According to one embodiment, the roofing material comprises a laminated roofing shingle.

In one embodiment, the roofing material exhibits a granule rub loss (g) of between 0.3 g and 3 g.

In one embodiment, the roofing material exhibits (a) cross-machine direction (CD) tear (gf) of between 1700 gf and 3000 gf, and (b) a machine direction (MD) tensile (lbf) of between 200 lbf and 300 lbf.

In one embodiment, the roofing material exhibits (a) cross-machine direction (CD) tear (gf) of between 1800 gf and 2500 gf, and (b) a machine direction (MD) tensile (lbf) of between 200 lbf and 250 lbf.

In one embodiment, the roofing material exhibits (a) cross-machine direction (CD) tear (gf) of between 2000 gf and 2500 gf, and (b) a machine direction (MD) tensile (lbf) of between 200 lbf and 250 lbf.

In one embodiment, the roofing material exhibits a nail pull through value (lbf) of between 50 and 100 lbf. In one embodiment, the roofing material exhibits a nail pull through value (lbf) of between 50 and 80 lbf.

In one embodiment, the roofing material exhibits a solar reflectivity of between 0.1 and 0.5.

Another embodiment of this invention pertains to a roofing material prepared by the method described above.

In an embodiment, the roofing material is one of a roofing shingle and a roofing membrane. According to one embodiment, the roofing material comprises a laminated roofing shingle. According to another embodiment, the roofing material is one of (i) a single layer roofing shingle or (ii) a laminated roofing shingle having two or more layers.

In one embodiment, the roofing material further comprises granules. In another embodiment, the roofing material further comprises fines. According to another embodiment, granules are applied to a first side of the coated substrate and fines are applied to a second side of the coated substrate.

In an embodiment, the substrate comprises one of a fiberglass mat, a polyester mat, a scrim, a membrane, or a combination thereof.

BRIEF DESCRIPTION OF THE FIGURES

For a more complete understanding of the invention and the advantages thereof, reference is made to the following descriptions, taken in conjunction with the accompanying figures, in which.

DETAILED DESCRIPTION OF THE INVENTION

Figure 1:
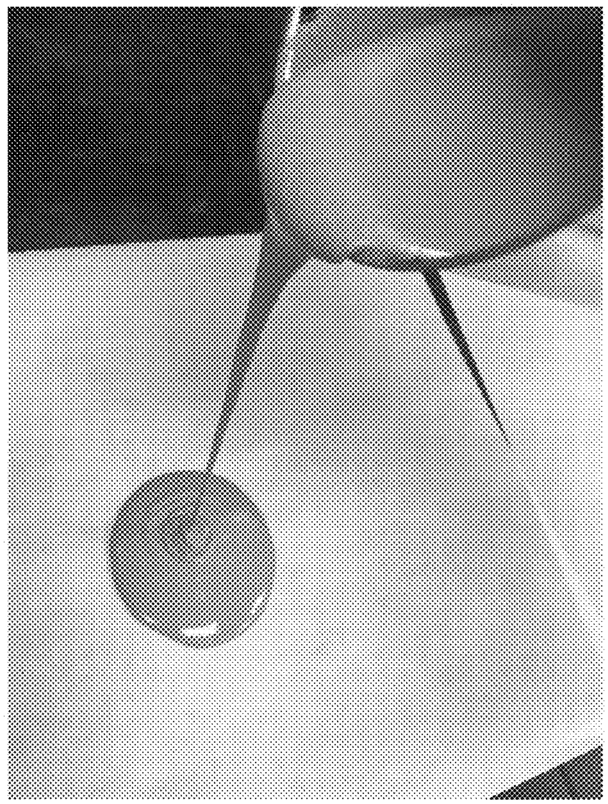
FIG. 1 is a photograph of a prepared coating composition according to an embodiment of the invention.

Among those benefits and improvements that have been disclosed, other objects and advantages of this disclosure will become apparent from the following description taken in conjunction with the accompanying figures. Detailed embodiments of the present disclosure are disclosed herein; however, it is to be understood that the disclosed embodiments are merely illustrative of the disclosure that may be embodied in various forms. In addition, each of the examples given regarding the various embodiments of the disclosure are intended to be illustrative, and not restrictive.

Throughout the specification and claims, the following terms take the meanings explicitly associated herein, unless the context clearly dictates otherwise. The phrases "in one embodiment," "in an embodiment," and "in some embodiments" as used herein do not necessarily refer to the same embodiment(s), though they may. Furthermore, the phrases "in another embodiment" and "in some other embodiments" as used herein do not necessarily refer to a different embodiment, although they may. All embodiments of the disclosure are intended to be combinable without departing from the scope or spirit of the disclosure.

As used herein, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, terms such as "comprising," "including," and "having" do not limit the scope of a specific claim to the materials or steps recited by the claim.

As used herein, terms such as "consisting of" and "composed of" limit the scope of a specific claim to the materials and steps recited by the claim.

All prior patents, publications, and test methods referenced herein are incorporated by reference in their entireties.

As used herein, the term "coated substrate" means a substrate that is coated on one side (upper surface or lower surface) or both sides (upper surface and lower surface) with a coating composition.

As used herein, the term "uncoated substrate" means a substrate that has not been coated on any side (upper surface and/or lower surface) with a coating composition.

As used herein, the term "roofing material" includes, but is not limited to, shingles, roofing membranes, including, e.g., waterproofing membranes, and underlayment.

As used herein, the term "aqueous" means a composition that includes some amount of water.

As used herein, the term "non-aqueous" means a composition that is "free of water" and/or "substantially free of water."

As used herein, the term "free of water" means a composition that has less than 1% by weight of water.

As used herein, the term "substantially free of water" means a composition that has less than 5% by weight of water.

As used herein, the term "polymeric resin" means any pre-polymeric resins and/or prepolymers that comprise oligomers, monomers, polymers, and mixtures of monomers and polymers.

As used herein, the term "room temperature" means a temperature that is at or about 77° F.

As used herein, the term "ambient temperature" means a temperature that is between 20° C. to 24° C. (68° F. to 75° F.).

This invention relates to a method of producing roofing materials (e.g., roofing shingles and other roofing materials) without external heat or necessity for heat. Typically, roofing shingles and similar products are produced by applying a hot coating or molten material to a substrate. The coated substrate is then capped with various types of materials such as, e.g., granules, which are pressed into the hot coating by mechanical means for proper adhesion to the coating after cooling. The method of this invention, however, involves a polymeric resin composition which undergoes a chemical reaction and/or a curing reaction at temperatures of at least 23° F. (and/or at ambient temperature), resulting in a coating that can be used in the production of roofing materials (e.g., roofing shingles and other materials). In some cases, some amount of heat is generated in situ during the reaction. As discussed, the coating cures at at least 23° F., at ambient temperatures, and/or uses reaction-generated heat to cure the coating into a rigid or a flexible thermoplastic coating or a rigid or a flexible thermoset material, depending on the composition and the chemical structure of the coating components. The coating can be prepared by exposing a polymer, prepolymer and/or a polymeric resin to a catalyst, activator, moisture, air, light, radiation, other appropriate curing agents or crosslinking agents, medium, or membranes, or any combination thereof. During the reaction process, the coating produced has the appropriate viscosity for application to a suitable substrate and continues to react to completely cure after application to the substrate. The reactive coating is applied to a substrate at the appropriate viscosity to achieve the desired coating coverage, substrate/coating thickness, capping material embedment/attachment, and other finished product properties. Capping materials, such as, e.g., granules and other suitable materials, may be applied without using a mechanical press and still achieve good adhesion. In some cases, there is increased loading of capping materials compared to conventional coatings to roofing shingles. In addition, even with higher granule loss, the roofing materials of the invention still show equivalent or comparable granule coverage when compared to shingles manufactured using the conventional shingle asphalt coating.

One embodiment of this invention pertains to a method of preparing a roofing material that includes (a) obtaining a substrate, (b) obtaining a non-foam, coating composition comprising a polymeric resin and a carrier, wherein the coating composition is (i) substantially free of water and (ii) in the form of a liquid at at least 23° F. (or at least 35° F., in the case where the polymeric resin includes some amount of water), (c) applying the coating composition to a surface of the substrate to prepare a coated substrate, and (d) exposing the coated substrate to a reaction generator to polymerize the coating composition and thereby solidify the coating composition on the coated substrate to form the roofing material.

In one embodiment, the method further comprises preparing the coating composition. According to another embodiment, the preparing the coating composition is conducted without applying heat.

In one embodiment, heat is generated in situ and released during the reaction to prepare the coating.

According to an embodiment, the coating composition is in the form of a liquid at at least 59° F.

In one embodiment, the carrier comprises a natural oil, a natural resin, a natural wax, a synthetic oil, a synthetic resin, a synthetic wax, or a combination thereof.

In one embodiment, the coating composition comprises the carrier in an amount of 1 percent to 8 percent by weight based on the total weight of the coating composition. In one embodiment, the coating composition comprises the carrier in an amount of 2 percent to 8 percent by weight based on the total weight of the coating composition. In one embodiment, the coating composition comprises the carrier in an amount of 3 percent to 8 percent by weight based on the total weight of the coating composition. In one embodiment, the coating composition comprises the carrier in an amount of 4 percent to 8 percent by weight based on the total weight of the coating composition. In one embodiment, the coating composition comprises the carrier in an amount of 5 percent to 8 percent by weight based on the total weight of the coating composition. In one embodiment, the coating composition comprises the carrier in an amount of 6 percent to 8 percent by weight based on the total weight of the coating composition. In one embodiment, the coating composition comprises the carrier in an amount of 7 percent to 8 percent by weight based on the total weight of the coating composition. In one embodiment, the coating composition comprises the carrier in an amount of 1 percent to 7 percent by weight based on the total weight of the coating composition. In one embodiment, the coating composition comprises the carrier in an amount of 2 percent to 7 percent by weight based on the total weight of the coating composition. In one embodiment, the coating composition comprises the carrier in an amount of 3 percent to 7 percent by weight based on the total weight of the coating composition. In one embodiment, the coating composition comprises the carrier in an amount of 4 percent to 7 percent by weight based on the total weight of the coating composition. In one embodiment, the coating composition comprises the carrier in an amount of 5 percent to 7 percent by weight based on the total weight of the coating composition. In one embodiment, the coating composition comprises the carrier in an amount of 6 percent to 7 percent by weight based on the total weight of the coating composition. In one embodiment, the coating composition comprises the carrier in an amount of 1 percent to 6 percent by weight based on the total weight of the coating composition. In one embodiment, the coating composition comprises the carrier in an amount of 2 percent to 6 percent by weight based on the total weight of the coating composition. In one embodiment, the coating composition comprises the carrier in an amount of 3 percent to 6 percent by weight based on the total weight of the coating composition. In one embodiment, the coating composition comprises the carrier in an amount of 4 percent to 6 percent by weight based on the total weight of the coating composition. In one embodiment, the coating composition comprises the carrier in an amount of 5 percent to 6 percent by weight based on the total weight of the coating composition. In one embodiment, the coating composition comprises the carrier in an amount of 1 percent to 5 percent by weight based on the total weight of the coating composition. In one embodiment, the coating composition comprises the carrier in an amount of 2 percent to 5 percent by weight based on the total weight of the coating composition. In one embodiment, the coating composition comprises the carrier in an amount of 3 percent to 5 percent by weight based on the total weight of the coating composition. In one embodiment, the coating composition comprises the carrier in an amount of 4 percent to 5 percent by weight based on the total weight of the coating composition. In one embodiment, the coating composition comprises the carrier in an amount of 1 percent to 4 percent by weight based on the total weight of the coating composition. In one embodiment, the coating composition comprises the carrier in an amount of 2 percent to 4 percent by weight based on the total weight of the coating composition. In one embodiment, the coating composition comprises the carrier in an amount of 3 percent to 4 percent by weight based on the total weight of the coating composition. In one embodiment, the coating composition comprises the carrier in an amount of 1 percent to 3 percent by weight based on the total weight of the coating composition. In one embodiment, the coating composition comprises the carrier in an amount of 2 percent to 3 percent by weight based on the total weight of the coating composition. In one embodiment, the coating composition comprises the carrier in an amount of 1 percent to 2 percent by weight based on the total weight of the coating composition.

In one embodiment, the polymeric resin comprises at least one of an acrylic, a methacrylate, urethane, isocyanate, epoxy, ester, alcohol, polyamides, polyimide, carboxylic acid, acid anhydride, aldehydes, vinyl chemistries, polyolefins, or combinations thereof. According to another embodiment, the polymeric resin comprises polymethyl methacrylate (PMMA).

In one embodiment, the coating composition comprises the polymeric resin in an amount of 40 percent to 80 percent by weight based on the total weight of the coating composition. In one embodiment, the coating composition comprises the polymeric resin in an amount of 50 percent to 80 percent by weight based on the total weight of the coating composition. In one embodiment, the coating composition comprises the polymeric resin in an amount of 60 percent to 80 percent by weight based on the total weight of the coating composition. In one embodiment, the coating composition comprises the polymeric resin in an amount of 70 percent to 80 percent by weight based on the total weight of the coating composition. In one embodiment, the coating composition comprises the polymeric resin in an amount of 40 percent to 70 percent by weight based on the total weight of the coating composition. In one embodiment, the coating composition comprises the polymeric resin in an amount of 50 percent to 70 percent by weight based on the total weight of the coating composition. In one embodiment, the coating composition comprises the polymeric resin in an amount of 60 percent to 70 percent by weight based on the total weight of the coating composition. In one embodiment, the coating composition comprises the polymeric resin in an amount of 40 percent to 60 percent by weight based on the total weight of the coating composition. In one embodiment, the coating composition comprises the polymeric resin in an amount of 50 percent to 60 percent by weight based on the total weight of the coating composition. In one embodiment, the coating composition comprises the polymeric resin in an amount of 40 percent to 50 percent by weight based on the total weight of the coating composition.

In one embodiment, the coating composition further comprises one or more of a solvent, an oil, a wax, a filler, or a combination thereof.

In one embodiment, the coating composition further comprises a filler in an amount of 10 percent to 65 percent by weight of the total weight of the coating composition. In one embodiment, the coating composition further comprises a filler in an amount of 20 percent to 65 percent by weight of the total weight of the coating composition. In one embodiment, the coating composition further comprises a filler in an amount of 30 percent to 65 percent by weight of the total weight of the coating composition. In one embodiment, the coating composition further comprises a filler in an amount of 40 percent to 65 percent by weight of the total weight of the coating composition. In one embodiment, the coating composition further comprises a filler in an amount of 50 percent to 65 percent by weight of the total weight of the coating composition. In one embodiment, the coating composition further comprises a filler in an amount of 10 percent to 60 percent by weight of the total weight of the coating composition. In one embodiment, the coating composition further comprises a filler in an amount of 20 percent to 60 percent by weight of the total weight of the coating composition. In one embodiment, the coating composition further comprises a filler in an amount of 30 percent to 60 percent by weight of the total weight of the coating composition. In one embodiment, the coating composition further comprises a filler in an amount of 40 percent to 60 percent by weight of the total weight of the coating composition. In one embodiment, the coating composition further comprises a filler in an amount of 50 percent to 60 percent by weight of the total weight of the coating composition. In one embodiment, the coating composition further comprises a filler in an amount of 55 percent by weight of the total weight of the coating composition. In one embodiment, the coating composition further comprises a filler in an amount of 20 percent to 50 percent by weight of the total weight of the coating composition. In one embodiment, the coating composition further comprises a filler in an amount of 30 percent to 50 percent by weight of the total weight of the coating composition. In one embodiment, the coating composition further comprises a filler in an amount of 40 percent to 50 percent by weight of the total weight of the coating composition. In one embodiment, the coating composition further comprises a filler in an amount of 20 percent to 40 percent by weight of the total weight of the coating composition. In one embodiment, the coating composition further comprises a filler in an amount of 30 percent to 40 percent by weight of the total weight of the coating composition. In one embodiment, the coating composition further comprises a filler in an amount of 20 percent to 30 percent by weight of the total weight of the coating composition.

In one embodiment, the filler comprises an inorganic filler, an organic filler, clay, a fire retardant(s), a UV stabilizer(s), an antioxidant, or a combination thereof.

In one embodiment, the reaction generator comprises at least one of (i) a catalyst or activator, (ii) one or more of a curing agent or a crosslinking agent or a curing membrane, (iii) moisture, (iv) air, (v) radiation, or (vi) any combination of (i), (ii), (iii), (iv), or (v).

In one embodiment, the method further comprises applying roofing granules to the coated substrate. According to another embodiment, the step of applying roofing granules to the coated substrate occurs prior to the step of exposing the coated substrate to a reaction generator to polymerize the coating composition. According to another embodiment, the step of applying roofing granules to the coated substrate is conducted with or without pressing. For example, according to one embodiment, the granules are not pressed into the coated substrate by mechanical means. Thus, according to this embodiment, the granules embed in the coating under their own weight and adhere to the coating and are held on the coating through the chemical reactions which cure the coating into a stiffened material.

According to one embodiment, the curing process can be accelerated by increasing the amount of curing agent or the intensity of the curing energy source (i.e., the reaction generator).

In one embodiment, the substrate comprises one of a fiberglass mat, a polyester mat, a scrim, a membrane, or a combination thereof.

In one embodiment, the coating composition has a viscosity of at least 200 cP when in the form of a liquid. In one embodiment, the coating composition has a viscosity of 500 cP to 500,000 cP when in the form of a liquid. In one embodiment, the coating composition has a viscosity of 1000 cP to 500,000 cP when in the form of a liquid. In one embodiment, the coating composition has a viscosity of 5000 cP to 500,000 cP when in the form of a liquid. In one embodiment, the coating composition has a viscosity of 10,000 cP to 500,000 cP when in the form of a liquid. In one embodiment, the coating composition has a viscosity of 50,000 cP to 500,000 cP when in the form of a liquid. In one embodiment, the coating composition has a viscosity of 100,000 cP to 500,000 cP when in the form of a liquid. In one embodiment, the coating composition has a viscosity of 250,000 cP to 500,000 cP when in the form of a liquid. In one embodiment, the coating composition has a viscosity of 500 cP to 100,000 cP when in the form of a liquid. In one embodiment, the coating composition has a viscosity of 1000 cP to 100,000 cP when in the form of a liquid. In one embodiment, the coating composition has a viscosity of 2500 cP to 100,000 cP when in the form of a liquid. In one embodiment, the coating composition has a viscosity of 5000 cP to 100,000 cP when in the form of a liquid. In one embodiment, the coating composition has a viscosity of 10,000 cP to 100,000 cP when in the form of a liquid. In one embodiment, the coating composition has a viscosity of 20,000 cP to 100,000 cP when in the form of a liquid. In one embodiment, the coating composition has a viscosity of 30,000 cP to 100,000 cP when in the form of a liquid. In one embodiment, the coating composition has a viscosity of 40,000 cP to 100,000 cP when in the form of a liquid. In one embodiment, the coating composition has a viscosity of 50,000 cP to 100,000 cP when in the form of a liquid. In one embodiment, the coating composition has a viscosity of 60,000 cP to 100,000 cP when in the form of a liquid. In one embodiment, the coating composition has a viscosity of 70,000 cP to 100,000 cP when in the form of a liquid. In one embodiment, the coating composition has a viscosity of 80,000 cP to 100,000 cP when in the form of a liquid. In one embodiment, the coating composition has a viscosity of 90,000 cP to 100,000 cP when in the form of a liquid. In one embodiment, the coating composition has a viscosity of 500 cP to 1000 cP when in the form of a liquid. In one embodiment, the coating composition has a viscosity of 500 cP to 2500 cP when in the form of a liquid. In one embodiment, the coating composition has a viscosity of 500 cP to 5000 cP when in the form of a liquid. In one embodiment, the coating composition has a viscosity of 500 cP to 10,000 cP when in the form of a liquid. In one embodiment, the coating composition has a viscosity of 500 cP to 20,000 cP when in the form of a liquid. In one embodiment, the coating composition has a viscosity of 500 cP to 30,000 cP when in the form of a liquid. In one embodiment, the coating composition has a viscosity of 500 cP to 40,000 cP when in the form of a liquid. In one embodiment, the coating composition has a viscosity of 500 cP to 50,000 cP when in the form of a liquid. In one embodiment, the coating composition has a viscosity of 500 cP to 60,000 cP when in the form of a liquid. In one embodiment, the coating composition has a viscosity of 500 cP to 70,000 cP when in the form of a liquid. In one embodiment, the coating composition has a viscosity of 500 cP to 80,000 cP when in the form of a liquid. In one embodiment, the coating composition has a viscosity of 500 cP to 90,000 cP when in the form of a liquid. In each of the embodiments described above, the viscosity is measured at, e.g., 73° F.

Figure 4:
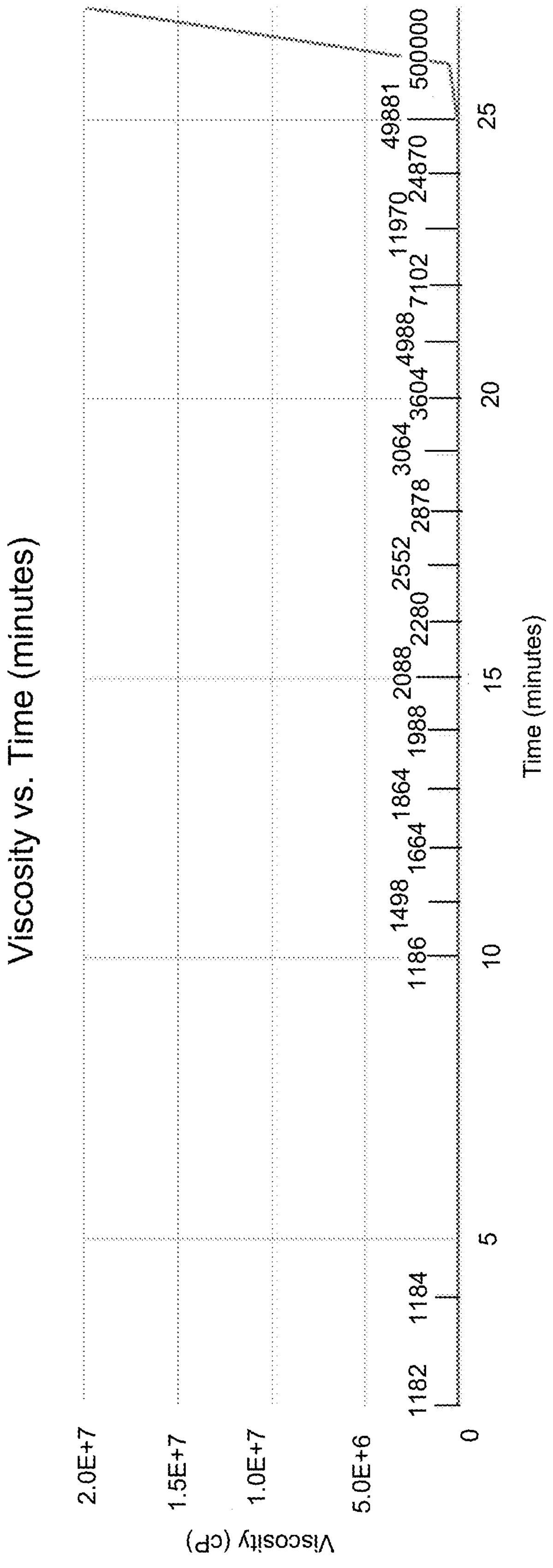
FIG. 4 is a graph illustrating the change in viscosity over time of a prepared coating composition according to an embodiment of the invention.

According to one embodiment, the viscosity of the coating composition increases over time as the coating composition transitions from a liquid to a solid, i.e., once the coating composition is polymerized and solidified after exposure to a reaction generator. For example, according to one embodiment as shown in FIG. 4, the viscosity of the coating composition increases from that of a liquid (e.g., a viscosity between 1000 cP to 500,000 cP) to a viscosity of a solidified liquid (e.g., a viscosity of greater than 500,000 cP) over time. As further shown in the embodiment of FIG. 4, the viscosity of the coating composition increases from that of a liquid (e.g., a viscosity between 1000 cP to 500,000 cP) to a viscosity of a solidified liquid (e.g., a viscosity of greater than 500,000 cP) within 30 minutes. According to another embodiment, the viscosity of the coating composition increases from that of a liquid (e.g., a viscosity between 1000 cP to 500,000 cP) to a viscosity of a solidified liquid (e.g., a viscosity of greater than 500,000 cP) between 1 minute and 60 minutes. According to another embodiment, the viscosity of the coating composition increases from that of a liquid (e.g., a viscosity between 1000 cP to 500,000 cP) to a viscosity of a solidified liquid (e.g., a viscosity of greater than 500,000 cP) between 1 minute and 45 minutes. According to another embodiment, the viscosity of the coating composition increases from that of a liquid (e.g., a viscosity between 1000 cP to 500,000 cP) to a viscosity of a solidified liquid (e.g., a viscosity of greater than 500,000 cP) between 1 minute and 30 minutes. According to another embodiment, the viscosity of the coating composition increases from that of a liquid (e.g., a viscosity between 1000 cP to 500,000 cP) to a viscosity of a solidified liquid (e.g., a viscosity of greater than 500,000 cP) between 1 minute and 20 minutes. According to another embodiment, the viscosity of the coating composition increases from that of a liquid (e.g., a viscosity between 1000 cP to 500,000 cP) to a viscosity of a solidified liquid (e.g., a viscosity of greater than 500,000 cP) between 1 minute and 15 minutes. According to another embodiment, the viscosity of the coating composition increases from that of a liquid (e.g., a viscosity between 1000 cP to 500,000 cP) to a viscosity of a solidified liquid (e.g., a viscosity of greater than 500,000 cP) between 1 minute and 10 minutes. According to another embodiment, the viscosity of the coating composition increases from that of a liquid (e.g., a viscosity between 1000 cP to 500,000 cP) to a viscosity of a solidified liquid (e.g., a viscosity of greater than 500,000 cP) between 1 minute and 5 minutes. According to another embodiment, the viscosity of the coating composition increases from that of a liquid (e.g., a viscosity between 1000 cP to 500,000 cP) to a viscosity of a solidified liquid (e.g., a viscosity of greater than 500,000 cP) between 5 minutes and 60 minutes. According to another embodiment, the viscosity of the coating composition increases from that of a liquid (e.g., a viscosity between 1000 cP to 500,000 cP) to a viscosity of a solidified liquid (e.g., a viscosity of greater than 500,000 cP) between 5 minutes and 45 minutes. According to another embodiment, the viscosity of the coating composition increases from that of a liquid (e.g., a viscosity between 1000 cP to 500,000 cP) to a viscosity of a solidified liquid (e.g., a viscosity of greater than 500,000 cP) between 5 minutes and 30 minutes. According to another embodiment, the viscosity of the coating composition increases from that of a liquid (e.g., a viscosity between 1000 cP to 500,000 cP) to a viscosity of a solidified liquid (e.g., a viscosity of greater than 500,000 cP) between 5 minutes and 20 minutes. According to another embodiment, the viscosity of the coating composition increases from that of a liquid (e.g., a viscosity between 1000 cP to 500,000 cP) to a viscosity of a solidified liquid (e.g., a viscosity of greater than 500,000 cP) between 5 minutes and 15 minutes. According to another embodiment, the viscosity of the coating composition increases from that of a liquid (e.g., a viscosity between 1000 cP to 500,000 cP) to a viscosity of a solidified liquid (e.g., a viscosity of greater than 500,000 cP) between 5 minutes and 10 minutes. According to another embodiment, the viscosity of the coating composition increases from that of a liquid (e.g., a viscosity between 1000 cP to 500,000 cP) to a viscosity of a solidified liquid (e.g., a viscosity of greater than 500,000 cP) between 10 minutes and 60 minutes. According to another embodiment, the viscosity of the coating composition increases from that of a liquid (e.g., a viscosity between 1000 cP to 500,000 cP) to a viscosity of a solidified liquid (e.g., a viscosity of greater than 500,000 cP) between 10 minutes and 45 minutes. According to another embodiment, the viscosity of the coating composition increases from that of a liquid (e.g., a viscosity between 1000 cP to 500,000 cP) to a viscosity of a solidified liquid (e.g., a viscosity of greater than 500,000 cP) between 10 minutes and 30 minutes. According to another embodiment, the viscosity of the coating composition increases from that of a liquid (e.g., a viscosity between 1000 cP to 500,000 cP) to a viscosity of a solidified liquid (e.g., a viscosity of greater than 500,000 cP) between 10 minutes and 20 minutes. According to another embodiment, the viscosity of the coating composition increases from that of a liquid (e.g., a viscosity between 1000 cP to 500,000 cP) to a viscosity of a solidified liquid (e.g., a viscosity of greater than 500,000 cP) between 10 minutes and 15 minutes. According to another embodiment, the viscosity of the coating composition increases from that of a liquid (e.g., a viscosity between 1000 cP to 500,000 cP) to a viscosity of a solidified liquid (e.g., a viscosity of greater than 500,000 cP) between 15 minutes and 60 minutes. According to another embodiment, the viscosity of the coating composition increases from that of a liquid (e.g., a viscosity between 1000 cP to 500,000 cP) to a viscosity of a solidified liquid (e.g., a viscosity of greater than 500,000 cP) between 15 minutes and 45 minutes. According to another embodiment, the viscosity of the coating composition increases from that of a liquid (e.g., a viscosity between 1000 cP to 500,000 cP) to a viscosity of a solidified liquid (e.g., a viscosity of greater than 500,000 cP) between 15 minutes and 30 minutes. According to another embodiment, the viscosity of the coating composition increases from that of a liquid (e.g., a viscosity between 1000 cP to 500,000 cP) to a viscosity of a solidified liquid (e.g., a viscosity of greater than 500,000 cP) between 15 minutes and 20 minutes. According to another embodiment, the viscosity of the coating composition increases from that of a liquid (e.g., a viscosity between 1000 cP to 500,000 cP) to a viscosity of a solidified liquid (e.g., a viscosity of greater than 500,000 cP) between 20 minutes and 60 minutes. According to another embodiment, the viscosity of the coating composition increases from that of a liquid (e.g., a viscosity between 1000 cP to 500,000 cP) to a viscosity of a solidified liquid (e.g., a viscosity of greater than 500,000 cP) between 20 minutes and 45 minutes. According to another embodiment, the viscosity of the coating composition increases from that of a liquid (e.g., a viscosity between 1000 cP to 500,000 cP) to a viscosity of a solidified liquid (e.g., a viscosity of greater than 500,000 cP) between 20 minutes and 30 minutes. According to another embodiment, the viscosity of the coating composition increases from that of a liquid (e.g., a viscosity between 1000 cP to 500,000 cP) to a viscosity of a solidified liquid (e.g., a viscosity of greater than 500,000 cP) between 30 minutes and 60 minutes. According to another embodiment, the viscosity of the coating composition increases from that of a liquid (e.g., a viscosity between 1000 cP to 500,000 cP) to a viscosity of a solidified liquid (e.g., a viscosity of greater than 500,000 cP) between 30 minutes and 45 minutes. According to another embodiment, the viscosity of the coating composition increases from that of a liquid (e.g., a viscosity between 1000 cP to 500,000 cP) to a viscosity of a solidified liquid (e.g., a viscosity of greater than 500,000 cP) between 45 minutes and 60 minutes.

In one embodiment, the step of applying the coating composition to a surface of the substrate is conducted via at least one of dip coating, die coating, spray coating, roll coating, extrusion and form molding, or a combination thereof.

Another embodiment of this invention pertains to a roofing material prepared by the method described above.

In an embodiment, the roofing material comprises one of a roofing shingle and a roofing membrane. According to one embodiment, the roofing material comprises a laminated roofing shingle. According to another embodiment, the roofing material is one of (i) a single layer roofing shingle or (ii) a laminated roofing shingle having two or more layers.

In one embodiment, the roofing material further comprises granules. In another embodiment, the roofing material further comprises fines. According to another embodiment, granules are applied to a first side of the coated substrate and fines are applied to a second side of the coated substrate.

In one embodiment, the roofing material exhibits a granule rub loss (g) of between 0.3 g and 3 g. In one embodiment, the roofing material exhibits a granule rub loss (g) of between 0.5 g and 3 g. In one embodiment, the roofing material exhibits a granule rub loss (g) of between 1 g and 3 g. In one embodiment, the roofing material exhibits a granule rub loss (g) of between 2 g and 3 g. In one embodiment, the roofing material exhibits a granule rub loss (g) of between 0.3 g and 2 g. In one embodiment, the roofing material exhibits a granule rub loss (g) of between 0.3 g and 1 g. In one embodiment, the roofing material exhibits a granule rub loss (g) of between 0.3 g and 0.5 g. In one embodiment, the roofing material exhibits a granule rub loss (g) of between 0.5 g and 1 g. In one embodiment, the roofing material exhibits a granule rub loss (g) of between 0.5 g and 2 g. In one embodiment, the roofing material exhibits a granule rub loss (g) of between 1 g and 2 g.

In one embodiment, the roofing material exhibits (a) cross-machine direction (CD) tear (gf) of between 2000 gf and 2500 gf, and (b) a machine direction (MD) tensile (lbf) of between 200 lbf and 250 lbf. In one embodiment, the roofing material exhibits (a) cross-machine direction (CD) tear (gf) of between 1800 gf and 2500 gf, and (b) a machine direction (MD) tensile (lbf) of between 200 lbf and 250 lbf. In one embodiment, the roofing material exhibits (a) cross-machine direction (CD) tear (gf) of between 1700 gf and 3000 gf, and (b) a machine direction (MD) tensile (lbf) of between 200 lbf and 300 lbf. In one embodiment, the roofing material exhibits (a) cross-machine direction (CD) tear (gf) of between 1700 gf and 2500 gf, and (b) a machine direction (MD) tensile (lbf) of between 210 lbf and 250 lbf.

In one embodiment, the roofing material exhibits a nail pull through value (lbf) of between 50 and 100 lbf. In one embodiment, the roofing material exhibits a nail pull through value (lbf) of between 50 and 90 lbf. In one embodiment, the roofing material exhibits a nail pull through value (lbf) of between 50 and 80 lbf. In one embodiment, the roofing material exhibits a nail pull through value (lbf) of between 50 and 75 lbf. In one embodiment, the roofing material exhibits a nail pull through value (lbf) of between 50 and 70 lbf. In one embodiment, the roofing material exhibits a nail pull through value (lbf) of between 55 and 80 lbf. In one embodiment, the roofing material exhibits a nail pull through value (lbf) of between 60 and 80 lbf. In one embodiment, the roofing material exhibits a nail pull through value (lbf) of between 70 and 80 lbf.

In one embodiment, the roofing material exhibits a solar reflectivity of between 0.1 and 0.5. In one embodiment, the roofing material exhibits a solar reflectivity of between 0.2 and 0.5. In one embodiment, the roofing material exhibits a solar reflectivity of between 0.3 and 0.5. In one embodiment, the roofing material exhibits a solar reflectivity of between 0.4 and 0.5. In one embodiment, the roofing material exhibits a solar reflectivity of between 0.1 and 0.4. In one embodiment, the roofing material exhibits a solar reflectivity of between 0.2 and 0.4. In one embodiment, the roofing material exhibits a solar reflectivity of between 0.3 and 0.4.

EXAMPLES

Specific embodiments of the invention will now be demonstrated by reference to the following examples. It should be understood that these examples are disclosed by way of illustrating the invention and should not be taken in any way to limit the scope of the present invention.

Example 1

Figure 2:
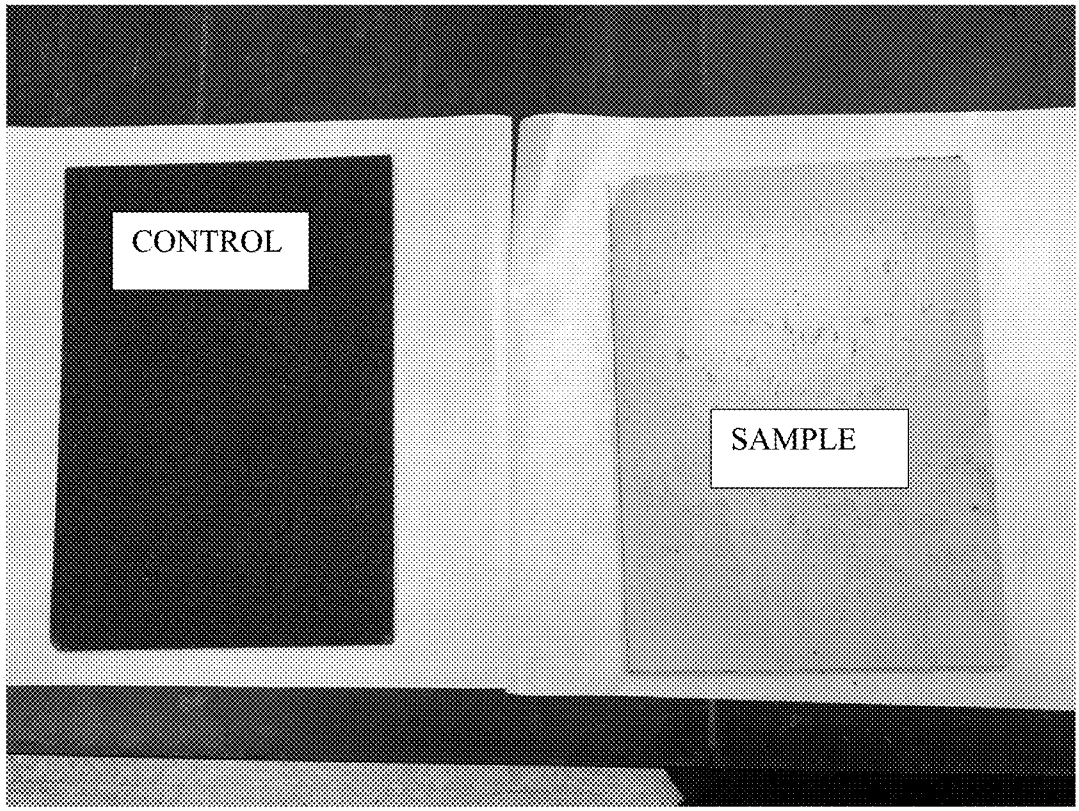
FIG. 2 is a photograph of a prepared roofing material as compared to an asphalt control roofing material according to an embodiment of the invention.
Figure 3:
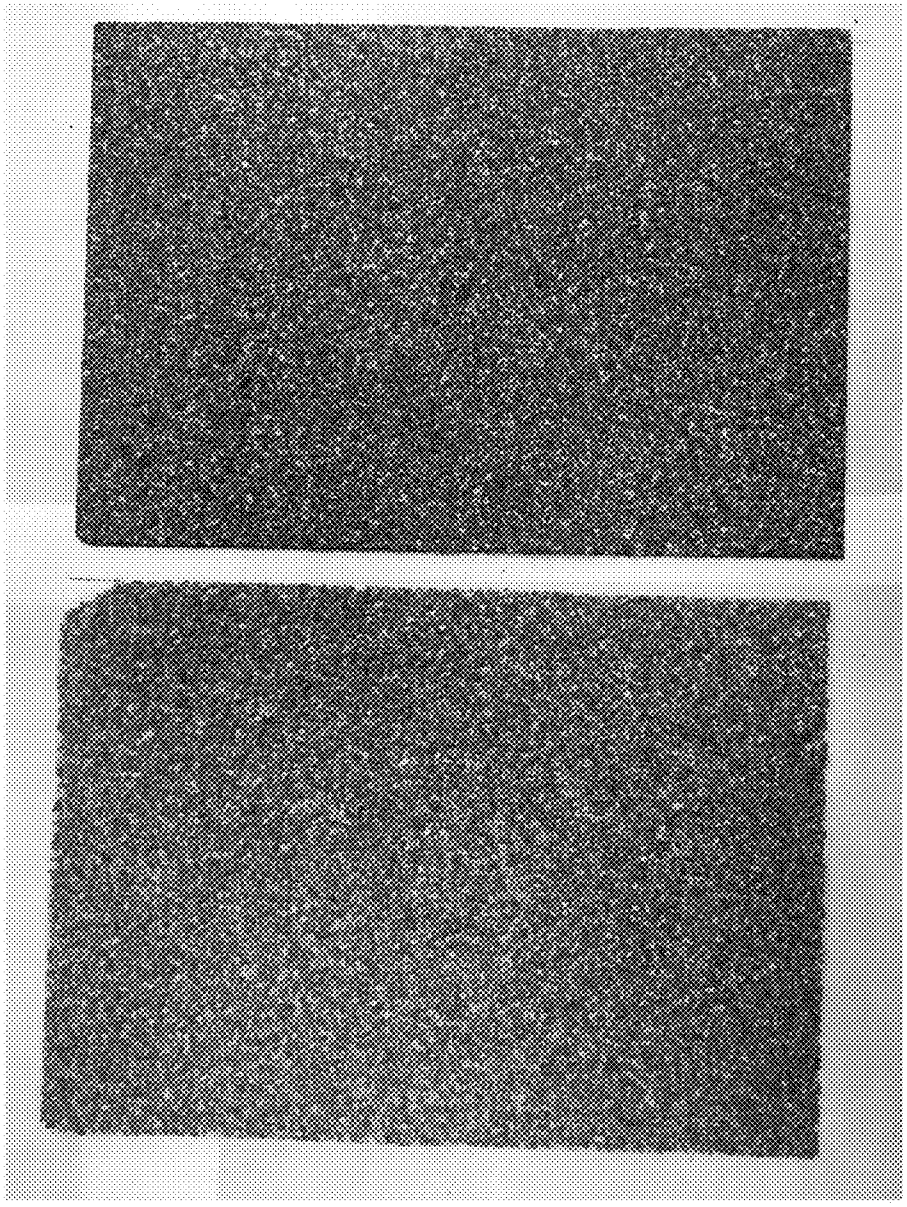
FIG. 3 is a photograph of prepared roofing materials according to an embodiment of the invention.

Samples were prepared to construct lab shinglet prototypes using a method of preparing roofing materials and a coating composition according to embodiments of the invention. The coating composition was applied to a substrate followed by broadcasting with granules. FIG. 1 is a photograph of a coating composition prepared according to this example. FIG. 2 is a photograph comparing (i) a control shingle comprising asphalt to (ii) a lab shinglet prototype prepared according to embodiments of the invention. FIG. 3 is a photograph of lab shinglet prototypes having granules applied thereto and prepared according to embodiments of the invention.

The test data results of the lab shinglet prototypes prepared according to this example, as compared to the control shingle, are shown in the following Table 1:

TABLE 1

| Property | Control Shingle | Example Shinglet |
|---|---|---|
| Coupon Weight per unit Area (3" × 2.5") (g) | 13.1 | 8.4 |
| Shinglet Weight (3" × 2.5") (g) | 16.1 | 14.8 |

TABLE 1-continued

| Property | Control Shingle | Example Shinglet |
|---|---|---|
| Shinglet Thickness (mils) (ASTM 5947) | 118 | 138 |
| Rub Loss (g) (ASTM D4977) | 0.3 | 2.1 |
| CD Tear (gf) (ASTM D1922) | 1700 | 2349 |
| MD Tensile (lbf) (ASTM D882) | 204 | 238 |
| Nail Pull Through (lbf) | 51 | 77 |
| Solar Reflectivity | 0.1 | 0.4 |

As shown in the test data results of Table 1 above, the lab shinglet prototype that was prepared using a method of preparing roofing materials and a coating composition according to embodiments of the invention exhibited improved/increased values for cross machine direction (CD) tear (gf), machine direction (IVID) tensile (lbf), nail pull through (lbf), and solar reflectivity, as compared to the control shingle.

Although the invention has been described in certain specific exemplary embodiments, many additional modifications and variations would be apparent to those skilled in the art in light of this disclosure. It is, therefore, to be understood that this invention may be practiced otherwise than as specifically described. Thus, the exemplary embodiments of the invention should be considered in all respects to be illustrative and not restrictive, and the scope of the invention to be determined by any claims supportable by this application and the equivalents thereof, rather than by the foregoing description.

We claim:

1. A method of preparing a roofing material comprising:

obtaining a substrate, wherein the substrate comprises one of a fiberglass mat, a polyester mat, a scrim, or a combination thereof, obtaining a non-foam, coating composition comprising a polymeric resin and a carrier, wherein the coating composition is (i) substantially free of water and (ii) in the form of a liquid at at least 23° F., wherein the polymeric resin is polymethyl methacrylate (PMMA);

applying the coating composition to an upper surface and a lower surface of the substrate to prepare a coated substrate; and exposing the coated substrate to a reaction generator to polymerize the coating composition and thereby solidify the coating composition on the coated substrate to form the roofing material, wherein the reaction generator comprises at least one of (i) a catalyst or activator, (ii) one or more of a curing agent or a crosslinking agent or a curing membrane, (iii) moisture, or (iv) any combination of (i), (ii), or (iii), and wherein the roofing material is configured to be installed onto a roof.

2. The method according to claim 1, wherein the coating composition is in the form of a liquid at at least 59° F.

3. The method according to claim 1, wherein the carrier comprises a natural oil, a natural resin, a natural wax, a synthetic oil, a synthetic resin, a synthetic wax, or a combination thereof.

4. The method according to claim 1, wherein the method further comprises applying roofing granules to the coated substrate.

5. The method according to claim 4, wherein the step of applying roofing granules to the coated substrate occurs prior to the step of exposing the coated substrate to a reaction generator to polymerize the coating composition.

6. The method according to claim 4, wherein the step of applying roofing granules to the coated substrate is conducted without pressing.

7. The method according to claim 1, wherein the coating composition further comprises one or more of a solvent, an oil, a wax, a filler, or a combination thereof.

8. The method according to claim 1, wherein the coating composition further comprises a filler in an amount of 30 percent to 60 percent by weight of the total weight of the coating composition.

9. The method according to claim 1, wherein the coating composition has a viscosity of at least 200 cP when in the form of a liquid.

10. The method according to claim 1, wherein the step of applying the coating composition to a surface of the substrate is conducted via at least one of dip coating, die coating, spray coating, roll coating, extrusion and form molding, or a combination thereof.

11. The method according to claim 1, wherein the roofing material comprises one of a roofing shingle and a roofing membrane.

12. A method of preparing a roofing material comprising:

preparing a non-foam, coating composition comprising a polymeric resin and a carrier, wherein the coating composition is (i) substantially free of water and (ii) in the form of a liquid at at least 23° F., wherein the polymeric resin is polymethyl methacrylate (PMMA); wherein the preparing the coating composition is conducted without applying heat;

obtaining a substrate, wherein the substrate comprises one of a fiberglass mat. a polyester mat, a scrim, or a combination thereof;

applying the coating composition to an upper surface and a lower surface of the substrate to prepare a coated substrate; and exposing the coated substrate to a reaction generator to polymerize the coating composition and thereby solidify the coating composition on the coated substrate to form the roofing material, wherein the reaction generator comprises at least one of (i) a catalyst or activator, (ii) one or more of a curing agent or a crosslinking agent or a curing membrane, (iii) moisture, or (iv) any combination of (i), (ii), or (iii), and wherein the roofing material is configured to be installed onto a roof.

13. The method according to claim 12, wherein the coating composition is in the form of a liquid at at least 59° F.

* * * * *